United States Patent
Tripathy et al.

(10) Patent No.: US 6,220,600 B1
(45) Date of Patent: Apr. 24, 2001

(54) LOW INSTALLATION/REMOVAL FORCE WEAR SLEEVE AND METHOD OF USE

(75) Inventors: Bhawani Sankar Tripathy, Canton; David Michael Toth, Brighton, both of MI (US); Brent Ryan Sedlar, Toledo, OH (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/414,192

(22) Filed: Oct. 7, 1999

(51) Int. Cl.$^7$ ....................................................... F16J 15/32
(52) U.S. Cl. ............................. 277/309; 277/551; 277/571
(58) Field of Search ................................... 277/309, 551, 277/571

(56) References Cited

U.S. PATENT DOCUMENTS

| | | |
|---|---|---|
| 2,836,441 * | 5/1958 | Doble . |
| 3,356,376 * | 12/1967 | Bradfute et al. . |
| 3,391,940 | 7/1968 | Baugh . |
| 3,395,950 * | 8/1968 | Brandt . |
| 3,482,844 * | 12/1969 | McKinven, Jr. . |
| 4,126,316 | 11/1978 | Cather, Jr. . |
| 4,552,367 * | 11/1985 | Fedorovich et al. . |
| 5,004,248 * | 4/1991 | Messenger et al. . |
| 5,082,294 | 1/1992 | Toth et al. . |
| 5,213,343 | 5/1993 | White, Jr. . |
| 5,299,677 | 4/1994 | Caillaud et al. . |

* cited by examiner

*Primary Examiner*—Anthony Knight
*Assistant Examiner*—John L. Beres
(74) *Attorney, Agent, or Firm*—Reising, Ethington, Barnes, Kisselle, Learman & McCulloch, P.C.

(57) ABSTRACT

An annular wear sleeve for a shaft seal is fabricated of an elastically deformable metal material and includes an annular body portion and an end flange portion. The sleeve is slightly oversized relative to the shaft on which it is installed to provide a low force slip-fit installation on the shaft. Once installed, the end flange is elastically deformed, imparting a radially inward bending force on the body portion causing the inner surface of the wear sleeve to constrict about and engage the outer surface of the shaft, providing intimate metal-to-metal contact therebetween to dissipate heat from the seal member and to secure the wear sleeve against rotation on the shaft in service. Releasing the deformation force on the end flange enables the wear sleeve to recover its elastic deformation, causing the wear sleeve to release the constricting engagement with the shaft enabling it to be dismounted from the shaft with low force in the same manner as was required for installation.

36 Claims, 4 Drawing Sheets

LOW INSTALLATION/REMOVAL FORCE WEAR SLEEVE AND METHOD OF USE

BACKGROUND OF THE INVENTION

1. Technical Field

This invention relates generally to dynamic shaft seals and more particularly to those employing a wear sleeve.

2. Related Prior Art

Shaft seals are used in engine applications and the like for sealing a bore or opening in a housing through which a rotatable shaft extends to prevent the leakage of lubricant and the ingress of contaminants. The typical shaft seal includes an outer annular metal carrier fixed to the housing. An annular seal member is fixed to the carrier and is formed with at least one inner annular seal lip encircling the shaft. In some applications, the seal lip runs directly on the outer surface of the shaft, whereas in other applications the lip runs on a metal wear sleeve disposed about and rotatable with the shaft. The wear sleeve provides a hard, smooth contact surface that is the same for all such seals independent of the condition of the shaft on which it is installed.

Wear sleeves are typically press-fitted onto the shaft in order to provide sufficient interference to secure the sleeve against movement on the shaft and to provide intimate metal-to-metal contact between the sleeve and the shaft to facilitate rapid dissipation of heat away from the seal member to protect the lip against premature wear or damage or material degradation or coking of the lubricant from exposure to excessive heat. The press-fit interference is achieved by closely matching the inner surface diameter of the sleeve to that of the outer surface of the shaft, such that when the sleeve is pressed onto the shaft, tight metal-to-metal press-fit engagement is provided therebetween.

One disadvantage of using such sleeves is that high installation forces are required for press-fitting the sleeve onto the shaft. The high force pressing operation requires special equipment and adds time and cost to the installation of seal assemblies. Moreover, press-fit seals are inherently difficult to remove once installed, since the press-fit engagement must be overcome. Special care must also be taken to avoid damaging the shaft and other components during removal of the press-fit sleeve.

U.S. Pat. No. 5,082,294, which is commonly owned by the assignee of the present invention and its disclosure incorporated herein by reference, discusses some alternatives to press-fit wear sleeves and proposes still others. An intermediate elastomeric liner is disposed between the wear sleeve and shaft to fix the wear sleeve against rotation on the shaft during service without the need for a press-fit connection. However, in applications where high heat transfer is needed, the elastic liner may present an undesirable barrier to the flow of heat from the wear sleeve to the shaft and thus may impair heat dissipation. An alternative solution proposed by the '294 patent is the provision of a deformable metallic liner that is squeezed with a press-fit between the wear sleeve and shaft to achieve the desired metal-to-metal contact for efficient conduction of heat away from the sealing lip. However, such an arrangement adds a component and steps to the installation process and does not overcome the problems associated with removing press-fitted wear sleeves.

Accordingly, there is a need in the industry for a wear sleeve that installs on the shaft with low insertion force and achieves intimate metal-to-metal contact with the shaft once installed, yet is removable from the shaft with low force to facilitate easy replacement of the seal assembly, and particularly the wear sleeve.

SUMMARY OF THE INVENTION AND ADVANTAGES

A shaft seal wear sleeve according to the invention is of the general type mountable on a rotatable shaft to provide a running surface for an annular seal member supported on a housing about an opening through which the shaft extends for sealing the opening against the leaking of lubricant and/or the ingress of contaminants. The wear sleeve is fabricated of an elastically deformable metal having an annular body portion whose inner surface is sized for a low force slip fit installation onto the shaft. Once installed, a radially extending flange portion of the sleeve is deflected through application of an axial load on the flange. Such axial deflection of the flange imparts a radially inward elastically recoverable force on the body portion causing it to constrict about and engage the shaft to provide intimate metal-to-metal contact therebetween so long as the axial load is maintained on the flange. Upon removal of the load, the flange and body portion recover their elastic deformation, causing the body portion to release the constricting engagement of the shaft enabling it to be removed with low force from the shaft.

A principal advantage of the present invention is that the wear sleeve can be installed on a shaft with low installation force, avoiding the need for a press-fit connection and the drawbacks associated therewith. Once installed, the wear sleeve of the invention has the further advantage of achieving intimate metal-to-metal contact with the shaft through deformation of the flange and corresponding constriction of the body portion about the shaft. The metal-to-metal contact provides good heat transfer characteristics which enables heat to be drawn away from the seal member into the wear sleeve and shaft to protect the seal member against heat damage.

A still further advantage of the invention is that by simply removing the axial load applied to the flange, the wear sleeve recovers its elastic deformation, releasing the constricting engagement with the shaft thereby enabling the wear sleeve to be slid off the shaft with a low removal force comparable to that required to install the sleeve on the shaft.

The elastically deformable wear sleeve of the invention has the further advantage of simplifying the installation and removal procedure of wear sleeves by eliminating the need for special equipment and/or techniques necessary to install and remove traditional press-fit wear sleeves at a recognized time and cost savings to the user.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
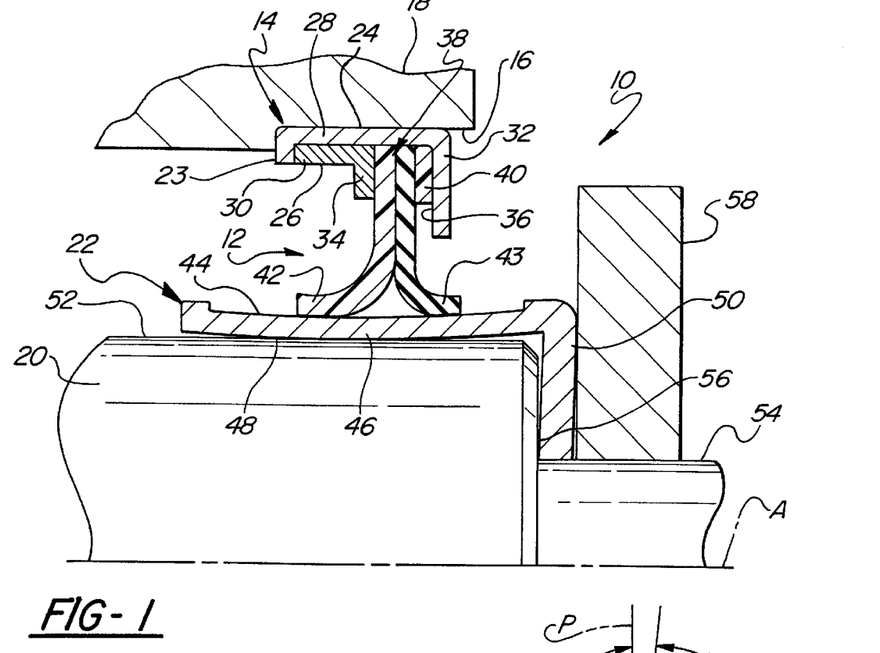
FIG. 1 is a fragmentary sectional view of a seal assembly embodying a wear sleeve constructed according to a first embodiment of the invention.

A dynamic shaft seal assembly having a wear sleeve constructed according to a first embodiment of the invention is shown generally at 10 in FIG. 1.

The seal assembly comprises a seal member 12 fixed to a carrier 14 for mounting about a bore or opening 16 of a housing 18 through which a rotatable shaft 20 extends for sealingly engaging a wear sleeve 22 carried on the shaft 20 in such manner as to contain a fluid, and typically lubricating oil, on an oil side 23 of the seal 12 to prevent its escape from the housing 18 through the opening 16.

The invention is concerned primarily with the construction of the wear sleeve 22 and the method of mounting the wear sleeve 22 on the shaft 20 to provide low installation and removal force while achieving intimate metal-to-metal contact with the shaft 20 when mounted. The wear sleeve 22 can be used in conjunction with any of a number of seal member and carrier configurations suitable for sealing interaction with a wear sleeve. By way of example, FIG. 1 shows a representative seal member 12 fabricated of a suitable resilient polymer material such as an elastomer, polytetrafluoroethylene (PTFE), and/or a combination of materials. While the illustrated seal member 12 is fixed to the carrier 14 by clamping, it is to be understood that other techniques used in the industry for securing such seal members to their carriers could also be employed, including but not limited to, molding, bonding, and the like. U.S. Pat. No. 5,082,294 illustrates such a molded seal element, the disclosure of which is incorporated herein by reference.

The illustrated carrier 14 of FIG. 1 includes an outer annular metal case 24 and an inner annular metal case 26 having nested cylindrical portions 28, 30, respectively. The portions 28, 30 terminate at one end in axially spaced, radially inwardly extending annular flanges 32, 34, respectively. The spaced flanges 32, 34 define an annular gap 36 therebetween in which a radially outer annular portion 38 of the seal member 12 is disposed. An elastomeric annular gasket 40 is also disposed in the gap 36. The seal member 12 and gasket 40 are compressed tightly between the flanges 32, 34 in order to fix the seal member 12 securely to the carrier 14 and to prevent the leakage of lubricant past the gasket 40.

The seal member 12 includes at least one seal lip 42 for sealingly engaging the wear sleeve 22. In the illustrated embodiment, two seal lips are employed, namely a primary oil containment lip 42 and a secondary debris-exclusion lip 43 extending about and sealingly engaging a cooperating outer cylindrical running surface 44 of the wear sleeve 22 to contain lubricant. The invention contemplates any of a number of single and multiple seal lip arrangements, an example of which is shown in U.S. Pat. No. 3,391,940, the disclosure of which is incorporated herein by reference.

The carrier 14 may be mounted on the housing 16 according to conventional practice such as by pressing the outer case 24 into the opening 16 with an interference fit such that the carrier 14 and seal member 12 are stationary and the seal lips 42, 43 are supported within the opening 16 in surrounding relation to the shaft 20 for sealing engagement with the wear sleeve 22.

The wear sleeve 22 according to the invention is fabricated of a hard, resiliently deformable metal material, which is capable of deforming elastically under load and recovering fully upon the removal of such load. One suitable family of resilient, elastically recoverable metallic materials is spring steel. Of course, other metal alloys and materials which exhibit the same or similar properties would be suitable and are contemplated by the invention.

The wear sleeve 22 includes an annular body portion 46 having an outer diameter surface serving as the aforementioned running surface 44 for the seal lip 42, and an inner diameter surface 48. The outer running surface 44 is preferably cylindrical and finished to the appropriate smoothness typical of wear sleeves for achieving good dynamic sealing interaction with the seal lips 42,43. The inner surface 48 of the first embodiment is substantially cylindrical and of uniform diameter along the length of the body portion 46.

The wear sleeve 22 further includes an annular flange portion 50 formed as one piece with the body portion 46 and preferably as a radial extension thereof at one end of the sleeve 22 projecting, in the first embodiment, radially inwardly of the body portion 46. The flange portion 50, when in an unstressed free condition as illustrated in broken chain lines in FIG. 2, forms an angle α relative to a plane P lying perpendicular to a central longitudinal axis A (FIG. 1) of the body portion 46, giving the end flange portion 50 a generally frusto-conical configuration. The angle α may fall in the range of about 1 to 10 degrees. It will further be seen that the angled end flange portion 50 is inclined axially toward the body portion 46 in the direction of its radially inner free end.

Figure 2:
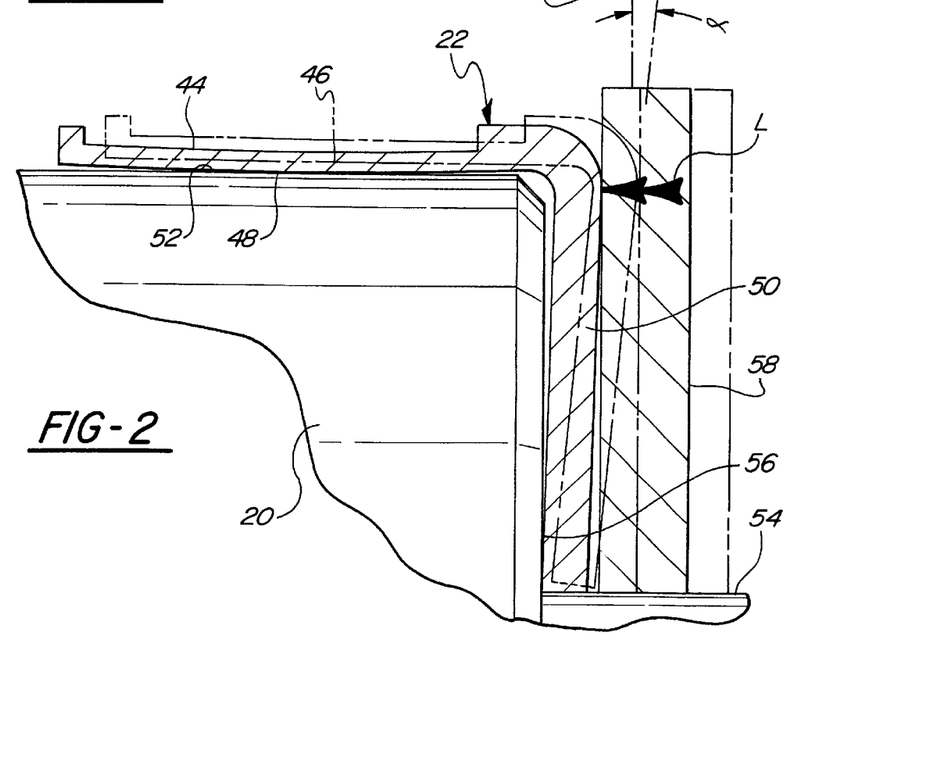
FIG. 2 enlarged fragmentary sectional view like FIG. 1 showing further details of the construction and operation of the wear sleeve.

As shown greatly exaggerated in FIG. 2, the inner surface 48 of the wear sleeve 22 is formed slightly oversized relative to an outer surface 52 of the shaft 20 on which the wear sleeve 22 is to be mounted. The size difference between the inner diameter of the wear sleeve 22 and the outer diameter of the shaft 20 is preferably that which is sufficient to enable the wear sleeve 22 to be slid with slip fit clearance onto the shaft 20 such that the fit is snug but offers low resistance to installation of the sleeve 22. By low resistance, it is meant that the size difference should be great enough to avoid the usual interference fit between the wear sleeve and shaft needed to achieve a press-fit connection. The axial installation forces typically required to press-fit a wear sleeve onto a shaft fall in the range of about 3,000 to 4,000 lbs. One aim of the present invention is to greatly lessen the force required to install and remove the wear sleeve 22 on the shaft below that's needed for press-fitting. The desired slip fit installation of the wear sleeve 22 on the shaft should be achievable if the size difference of the respective diameters is kept in the range of about 0.001 to 0.005 inches. The desired slip fit connection requires an axial installation force approaching zero. Ideally, the sleeve 22 is able to be slid onto and off of the shaft by hand (i.e., on the order of 5 lbs. or less), far below the force required to install a press-fit wear sleeve. As shown greatly exaggerated in FIG. 2, the inner surface 48 of the oversized body portion 46 is spaced from the outer surface 52 of the shaft 20 when slid into position on the shaft 20 in the unstressed broken chain line condition prior to deformation.

As also shown best in FIG. 2, the shaft 20 includes a reduced diameter end section 54 presenting an annular step or shoulder 56 facing axially away from the body portion 46. When installed on the shaft 20, the angled end flange portion 50 is caused to confront the shoulder 56 in its pre-deformed condition. According to the invention, an axial load L (e.g., in the range of 500 to 5,000 lbs.) is exerted on the end flange portion 50 sufficient to deflect and elastically deform the end flange portion 50 axially relative to the body portion 46 and preferably away from the body portion which tends to straighten the end flange portion 50 toward alignment with the plane P. Such elastic deformation of the end flange portion 50 imparts a corresponding radially inwardly directed bending force or load on the body portion 46. The body portion 46 responds by elastically yielding under the load, causing at least a circumferentially continuous portion of the inner surface 48 of the wear sleeve to constrict about and engage the outer surface 52 of the shaft 20, achieving intimate metal-to-metal contact between the wear sleeve 22 and shaft 20 and providing sufficient frictional resistance therebetween to support the wear sleeve against rotation on the shaft 20 during service.

Still referring to FIGS. 1 and 2, the present wear sleeve 22 is particularly suitable in applications where a component 58 is to be mounted on the shaft 20 adjacent the end flange portion 50. In such a case, the component 58 can be forced axially against the wear sleeve 22, compressing the end flange portion 50 between the component 58 and the shoulder 56, causing the end flange portion 50 to deform elastically in the manner described above, as illustrated by the solid line position of the component 58 of FIGS. 1 and 2. With the component 58 clamped in place, the wear sleeve 22 retains the metal-to-metal engagement with the shaft 20. In such an application, the shaft 20 may comprise, for example, a crank shaft and the component 58 may comprise, for example, a gear, damper, pulley, etc.

Since the wear sleeve 22 is elastically deformable, the sleeve 22 has the added advantage of recovering its original shape upon removal of the load L. Thus, by simply unclamping the component 58 as shown in the broken chain line position of FIG. 2, the end flange portion 50 and thus the body portion 46 is permitted to return to the original pre-stressed condition, causing the inner surface 48 of the wear sleeve 22 to return outwardly releasing the constricting engagement with the shaft 20. Upon recovery of the wear sleeve 22, the wear sleeve 22 is able to be removed from the shaft 20 with the same low force (i.e., slip-fit removal) as required for installation, greatly simplifying the task of replacing wear sleeves.

Figure 3:
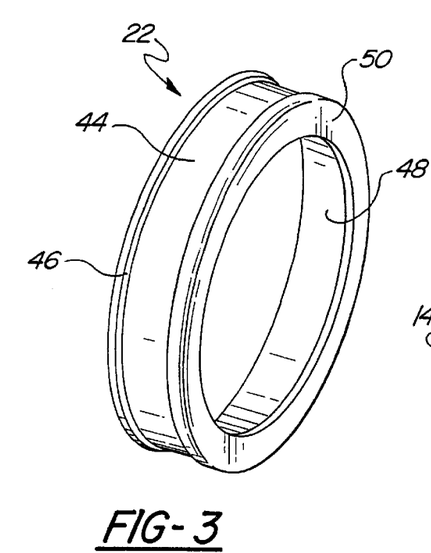
FIG. 3 a perspective view of the wear sleeve of FIGS. 1 and 2.

As illustrated in FIGS. 1–3, the body portion 46 may be formed with a wall thickness relatively less than that of the end flange portion 50. The relatively thinner-walled body portion 46 has the advantage of increasing the flexibility and thus elastic deformability of the body section 50, helping the body portion 46 to conform to the outer surface 52 of the shaft 20 when mounted under load to aid in achieving the desired metal-to-metal contact between the wear sleeve 22 and shaft 20. The reduced wall thickness of the body portion 46 may be achieved by employing a variable thickness sleeve of metal in forming the sleeve 22, or by machining the body portion 46 to remove the unwanted material.

Figure 4:
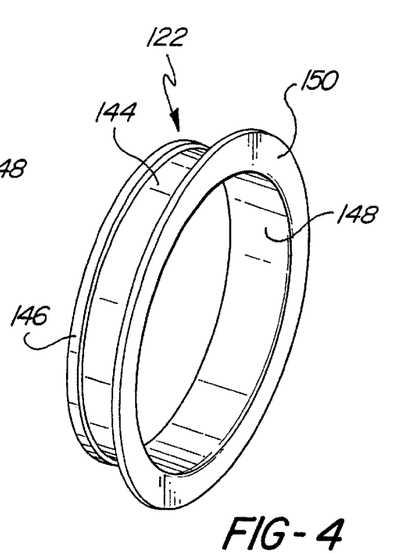
FIG. 4 is a perspective view of a wear sleeve constructed according to a second embodiment of the invention.
Figure 5:
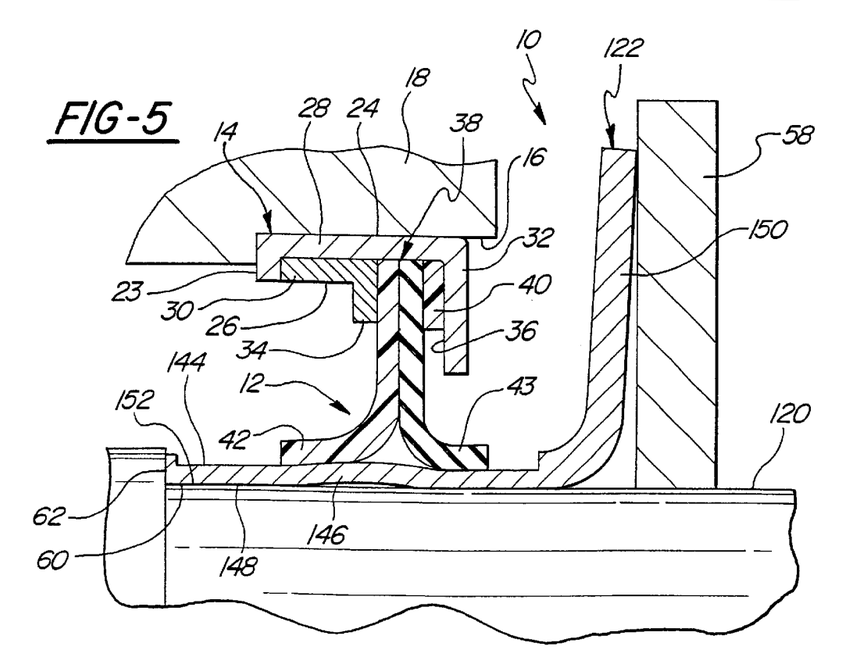
FIG. 5 is a view like FIG. 1 but embodying the wear sleeve of FIG. 3 shown in the clamped condition.
Figure 6:
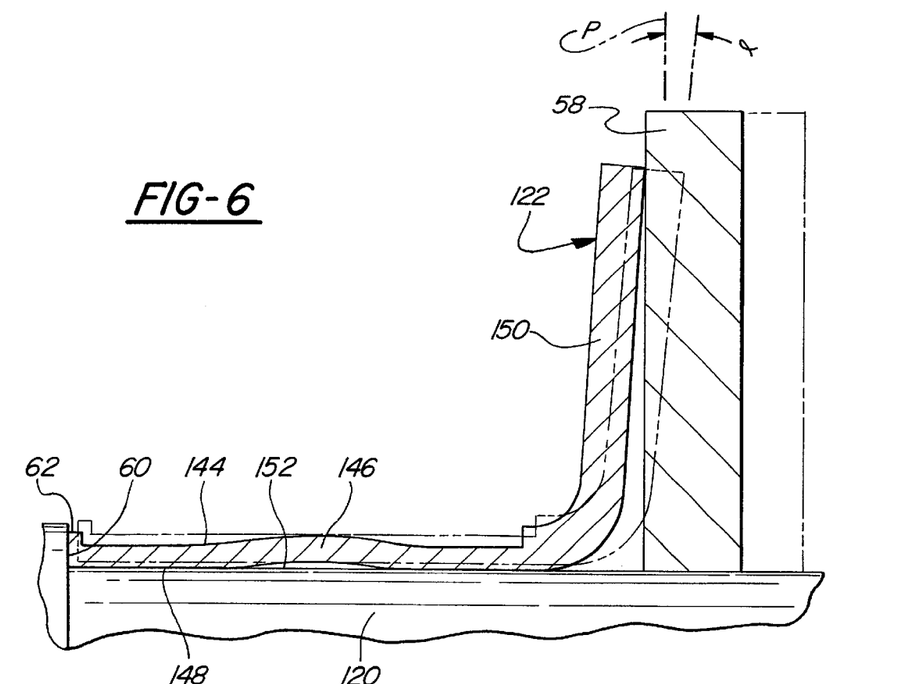
FIG. 6 is an enlarged fragmentary sectional view like of the wear sleeve of FIG. 5 shown in the clamped (solid lines) and unclamped (broken chain lines) conditions.

FIGS. 4–6 illustrate a wear sleeve 122 constructed according to a second embodiment of the invention, wherein the same reference numerals are used to designate like features with the first embodiment, but are offset by 100 with respect to the sleeve and shaft. The wear sleeve 122 is like that of the wear sleeve 22 of the first embodiment, except that the end flange portion 150 projects radially outwardly of the body portion 146 and is angled axially away from the body portion 146 at angle α relative to the plane P. The end flange 150 deforms in similar manner axially toward the body portion 146, imparting a similar radially inward bending force on the body portion 46, causing the inner surface 48 thereof to constrict about the outer surface 152 of the shaft 120 to provide intimate metal-to-metal contact therebetween.

Unlike the first embodiment, however, the end flange portion 150 is not compressed between the component 58 and an opposing shoulder of the shaft. Instead, the shaft 120 is formed with a step 60 which is confronted by the opposite toe end 62 of the sleeve 122. When clamped, the engagement of the toe end 62 with the step 60 supports the toe end 62 tightly against the shaft 120, providing increased contact area between the wear sleeve 122 and shaft 120.

Figure 7:
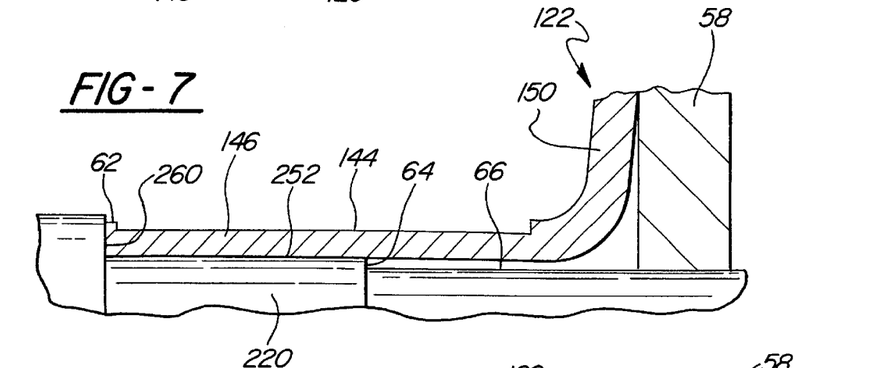
FIG. 7 is an enlarged fragmentary sectional view of the wear sleeve of FIG. 6 shown installed on a modified shaft.
Figure 8:
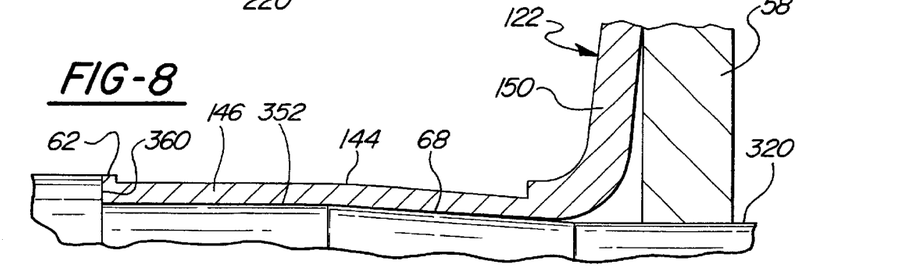
FIG. 8 is a view like FIG. 6 but showing the wear sleeve installed on another modified shaft.

FIGS. 7 and 8 illustrate two additional variations of the FIG. 4–6 embodiment. The same wear sleeve 122 is employed and thus the same reference numerals will be used to correspond to like parts with respect to the sleeve 22. However, the shafts 220, 320 are different and thus the same reference numerals are used to designate like features of the shaft the first embodiment, but are offset by 200 and 300, respectfully. In the FIG. 7 embodiment, the shaft 220 is formed with an additional step 64 adjacent the flange end of the body portion 146. The step 64 has the effect of providing a reduced diameter section 66 of the shaft 220, enabling the body portion 146 of the wear sleeve 122 adjacent the end flange portion 150 to deflect further inwardly beyond the outer surface region of the shaft 252 on which the remaining body section 146 is supported. Providing clearance beneath the body portion 146 in the reduced section 66 has the effect of shifting the maximum contact area of the body portion 146 axially toward the toe end 62, which in some applications may be beneficial to locate the contact area beneath or closer to the contact region of the seal lip 42 or lips.

The FIG. 8 embodiment is similar to the FIG. 7 embodiment, except that instead of providing a step 64, the end of the shaft 320 adjacent the flange portion 150 of the wear sleeve 122 is contoured at 68 in such manner as to conform closely to the shape of the inner surface 148 of the sleeve 122 when under load from the component 58 in order to provide complete or nearly complete metal-to-metal contact between the sleeve 122 and the shaft 320 along the full length of the body portion 146. As illustrated in FIG. 8, the contoured region 68 may comprise a reduced diameter tapered section of the shaft 320.

Figure 9:
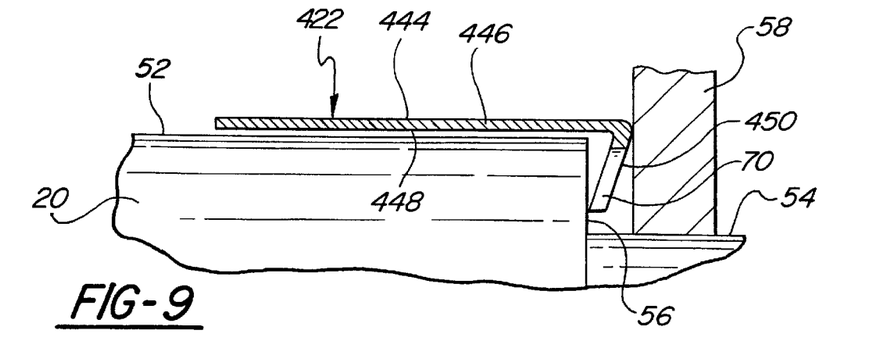
FIG. 9 is a fragmentary sectional view of a wear sleeve constructed to a third embodiment shown installed on a shaft in a pre-clamped condition.
Figure 10:
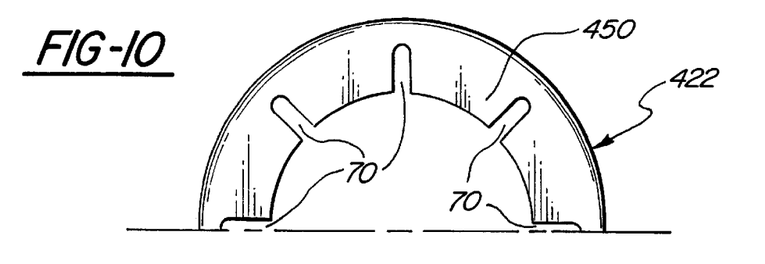
FIG. 10 is a fragmentary end view of the wear sleeve of FIG. 9.

FIGS. 9–10 illustrate yet another embodiment of a wear sleeve 422 according to the invention shown mounted on the shaft 20 of FIG. 1, wherein like reference numerals are used to designate like features of the wear sleeve, but are offset by 400. The wear sleeve 422 is of the same construction and operation as the wear sleeve 22 of the first embodiment of FIGS. 1–3, except that the end flange portion 450 is formed with a plurality of circumferentially spaced, radially extending slots 70 for increasing the flexibility of the end flange portion 450.

Figure 11:
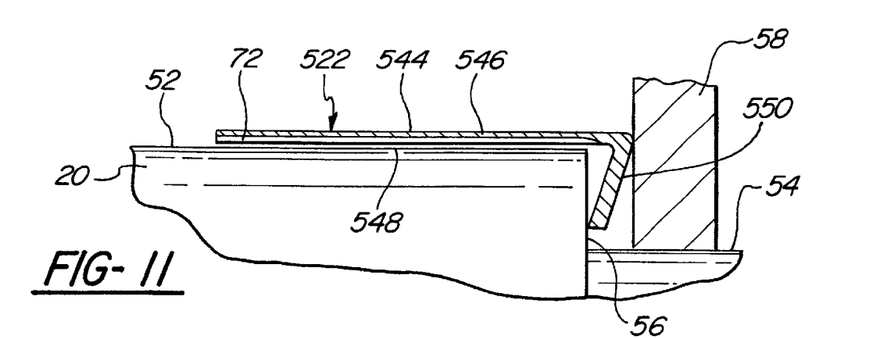
FIG. 11 is a view like FIG. 9 but of an alternative wear sleeve construction according to a fourth embodiment of the invention.
Figure 12:
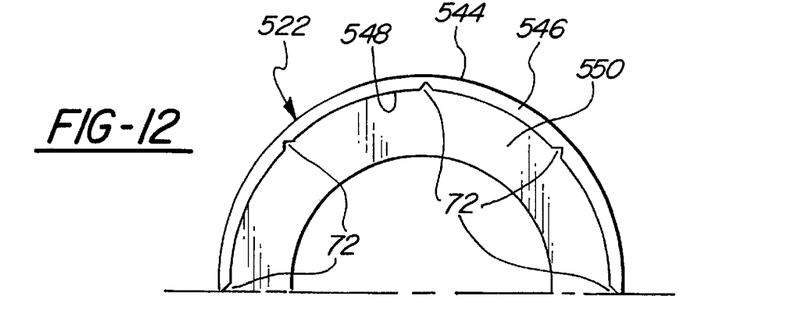
FIG. 12 is an end view of the wear sleeve of FIG. 11.

Finally, FIGS. 11–12 illustrate yet a further embodiment of a wear sleeve 522 according to the invention shown mounted on the shaft 20 of FIG. 1, wherein like reference numerals are used to designate like features of the wear sleeve, but are offset by 500. The wear sleeve 522 is identical in construction and operation as the wear sleeve 22 of the first embodiment of FIGS. 1–3, except that the inner surface 548 of the body portion 546 is formed with a plurality of circumferentially spaced, axially extending grooves or channels 72 for increasing the flexibility of the body portion 546.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of supporting a wear sleeve of a dynamic oil seal assembly on an outer surface of a rotatable shaft of predetermined diameter projecting through an opening in a housing for ease of installation and removal of the wear sleeve, said method comprising:

preparing a wear sleeve of an elastically resilient metal including an annular body portion having an inner surface sized relative to the outer surface of the shaft for a low application force slip fit onto the shaft, an outer surface providing a running surface for engagement by a seal member of the seal assembly mounted on the housing for sealing the opening against leakage, and including an annular flange portion projecting radially from the body portion;

sliding the wear sleeve onto the shaft while maintaining slip fit clearance between the inner surface of the sleeve and the outer surface of the shaft to provide low force installation; and applying an axial load on the flange portion sufficient to elastically deflect the flange portion axially of the body portion and thereby impart a radially inward constricting force on the body portion causing the inner surface of the body portion to forcibly engage the outer surface of the shaft to provide metal-to-metal contact therebetween in the vicinity of the imparted constricting force so long as the axial load is maintained.

2. The method of claim 1 including removing the axial load permitting the flange portion to recover the elastic deformation thereby releasing the imparted constricting force on the body portion causing the body portion to release the forcible engagement the shaft to facilitate low force removal of the sleeve from the shaft.

3. The method of claim 1 wherein the axial load is applied by a component mounted on the shaft in abutting engagement with the flange portion of the wear sleeve.

4. The method of claim 2 wherein the sleeve is self-releasing from constricting engagement with the shaft upon disengaging the flange portion with the component.

5. The method of claim 2 wherein the flange portion is formed as an axially inwardly projecting extension of the body portion at an end thereof.

6. The method of claim 5 wherein the flange portion is deflected by clamping the flange portion between the component and an end face of the shaft.

7. The method of claim 6 wherein the flange portion in its relaxed state is disposed at an inward angle so as to project axially toward the body portion, and displaced during clamping toward a generally perpendicular orientation relative to a longitudinal axis of the body portion.

8. The method of claim 2 wherein the flange portion is formed as an axially outwardly projecting extension of the body portion at an end thereof.

9. The method of claim 8 wherein the flange portion in its relaxed state is disposed at an outward angle so as to project axially away from the body portion, and is displaced during clamping toward a generally perpendicular orientation relative to a longitudinal axis of the body portion.

10. The method of claim 1 including fabricating the wear sleeve from spring steel.

11. A method of installing an oil seal assembly on a housing and shaft assembly in a manner that permits relative ease of installation and removal of a wear sleeve of the seal assembly from the shaft, said method comprising:

mounting an outer annular carrier of the seal assembly on the housing about an opening through which the shaft extends, the carrier supporting an inner annular seal member;

fabricating the wear sleeve of an elastically deformable metal having an annular body portion with an inner surface sized relative to an outer surface of the shaft for a low application force slip fit onto the shaft and an outer surface providing a running surface for engagement by the seal member of the seal assembly for sealing the opening against leakage, and an annular flange portion projecting radially from the body portion; and sliding the wear sleeve onto the shaft with low force, and bringing the seal member into sealing engagement with the outer surface of the wear sleeve and applying an axial load to the flange portion sufficient to elastically deflect the flange portion axially of the body portion imparting a radially inward elastically recoverable constricting force on the body portion causing the inner surface of the body portion to constrict about and engage the outer surface of the shaft to provide intimate metal-to-metal contact therebetween in the vicinity of the imparted constricting force so long as the axial load is maintained.

12. The method of claim 11 including removing the axial load permitting the flange and body portions to recover their elastic deformation thereby releasing the body portion from the constricting engagement with the shaft to facilitate low force removal of the sleeve from the shaft.

13. The method of claim 11 wherein the axial load is applied by a component mounted on the shaft in abutting engagement with the flange portion of the wear sleeve.

14. The method of claim 12 wherein the sleeve is self-releasing from constricting engagement with the shaft upon disengaging the flange portion with the component.

15. The method of claim 12 wherein the flange portion is formed as an axially inwardly projecting extension of the body portion at an end thereof.

16. The method of claim 15 wherein the flange portion is deflected by clamping the flange portion between the component and an end face of the shaft.

17. The method of claim 16 wherein the flange portion in its relaxed state is disposed at an inward angle so as to project axially toward the body portion, and displaced during clamping toward a generally perpendicular orientation relative to a longitudinal axis of the body portion.

18. The method of claim 12 wherein the flange portion is formed as an axially outwardly projecting extension of the body portion at an end thereof.

19. The method of claim 18 wherein the flange portion in its relaxed state is disposed at an outward angle so as to project axially away from the body portion, and is displaced during clamping toward a generally perpendicular orientation relative to a longitudinal axis of the body portion.

20. The method of claim 11 including fabricating the wear sleeve from spring steel.

21. A dynamic oil seal assembly comprising:

an outer annular carrier mountable on a housing about an opening through which a shaft extends;

an seal member fixed to said carrier having at least one inner annular sealing lip;

a wear sleeve fabricated of elastically deformable metal mountable on the shaft having a generally cylindrical body portion with an inner surface of predetermined diameter adapted to surround an outer surface of the shaft, an outer surface engagable by the sealing lip, and an annular end flange portion projecting radially of said body portion from one end thereof as a continuous extension of said body portion; and characterized by the inner surface of the body portion being oversized relative to the diameter of the outer surface of the shaft on which it is to be installed such that said wear sleeve is slidable onto the shaft with relatively low installation force below that required for press-fit installation of a wear sleeve on a shaft, and said end flange portion being elastically deflectable axially of said body portion to impart a radially inward constricting force on said body portion causing the initially oversized inner surface of the body portion to constrict about and engage the outer surface of the shaft to provide intimate metal-to-metal contact therebetween in the vicinity of the imparted constricting force.

22. The assembly of claim 21 wherein said end flange portion projects radially inwardly of said body portion at an angle relative to a plane perpendicular to a longitudinal axis of said body portion when said end flange portion is in an unstressed relaxed state.

23. The assembly of claim 22 wherein said end flange portion is angled axially toward said body portion.

24. The assembly of claim 21 wherein said end flange portion projects radially outwardly of said body portion at an angle relative to a plane perpendicular to a longitudinal axis of said body portion when said end flange portion is in an unstressed relaxed state.

25. The assembly of claim 24 wherein said end flange portion is angled axially away from said body portion.

26. The assembly of claim 21 wherein said end flange portion includes radially extending slots.

27. The assembly of claim 21 wherein said inner surface of said body portion includes a plurality of axially extending channels.

28. A wear sleeve construction for a dynamic shaft seal comprising:

a generally cylindrical body portion extending between axially opposite ends and having an inner surface for engaging a rotatable shaft extending through an opening in a housing to be sealed and an outer surface for rotary sealing engagement with an annular sealing member supported by the housing; and an end flange portion projecting radially from said body portion at a predetermined angle with respect to a plane normal to the axis of said body portion when said end flange portion is in an unstressed free condition, said end flange portion being elastically deflectable axially of said body portion in response to application of an axial load thereto imparting an elastically recoverable radially inward constricting force on said body portion and elastically recoverable to said unstressed state upon removal of said axial load, whereby said sleeve in its unstressed condition is slidable with low installation force onto a shaft and in response to application of said axial deflecting load on said end flange portion causes an inner surface of said body portion to constrict about and engage the outer surface of the shaft to provide intimate metal-to-metal contact between said sleeve and the shaft, and whereupon removing of such axial deflecting load causes said end flange portion and said body portion to recover elastically thereby releasing said constricting engagement with the shaft enabling said sleeve to be slid off of the shaft with low removal force to facilitate easy replacement of said sleeve.

29. The wear sleeve construction of claim 28 wherein said end flange and body portions are fabricated of spring steel.

30. The wear sleeve construction of claim 28 wherein said end flange portion extends radially inwardly of said body portion.

31. The wear sleeve construction of claim 28 wherein said end flange portion extends radially outwardly of said body portion.

32. The wear sleeve construction of claim 28 wherein said body portion is tapered along at least a portion of its length.

33. The wear sleeve construction of claim 28 wherein said body portion includes a tapered section adjacent said end flange portion and a cylindrical section adjacent an opposite end of said body portion.

34. The wear sleeve construction of claim 28 wherein said body portion and said end flange portion have respective wall thicknesses, said thickness of said body portion being relatively less than that of said end flange portion.

35. The wear sleeve construction of claim 28 wherein said body portion includes a plurality of channels formed in an inner wall of said body portion.

36. The wear sleeve construction of claim 28 wherein said end flange portion includes a plurality of radial slots.

* * * * *

UNITED STATES PATENT AND TRADEMARK OFFICE
CERTIFICATE OF CORRECTION

PATENT NO. : 6,220,600 B1  Page 1 of 1
DATED : April 24, 2001
INVENTOR(S) : Bhawahi S. Tripathy et al.

It is certified that error appears in the above-identified patent and that said Letters Patent is hereby corrected as shown below:

Column 2,
Line 61, after "FIG. 2" insert -- is an --;
Line 64, after "FIG. 3" insert -- is --.

Signed and Sealed this

Thirteenth Day of November, 2001

Attest:

NICHOLAS P. GODICI
Attesting Officer  *Acting Director of the United States Patent and Trademark Office*